United States Patent
Thomas et al.

(10) Patent No.: US 10,372,500 B1
(45) Date of Patent: Aug. 6, 2019

(54) REGISTER ALLOCATION SYSTEM

(71) Applicant: Apple Inc., Cupertino, CA (US)

(72) Inventors: Christopher S. Thomas, Austin, TX (US); James N. Hardage, Jr., Austin, TX (US); Christopher M. Tsay, Austin, TX (US)

(73) Assignee: Apple Inc., Cupertino, CA (US)

( * ) Notice: Subject to any disclaimer, the term of this patent is extended or adjusted under 35 U.S.C. 154(b) by 455 days.

(21) Appl. No.: 15/046,364

(22) Filed: Feb. 17, 2016

(51) Int. Cl.
  *G06F 9/50* (2006.01)
  *G06F 9/48* (2006.01)

(52) U.S. Cl.
  CPC .......... *G06F 9/5055* (2013.01); *G06F 9/4881* (2013.01)

(58) Field of Classification Search
  None
  See application file for complete search history.

(56) References Cited

U.S. PATENT DOCUMENTS

| | | | |
|---|---|---|---|
| 6,883,107 B2 | 4/2005 | Rodgers et al. | |
| 7,509,511 B1 | 3/2009 | Barowski et al. | |
| 7,539,879 B2 | 5/2009 | Terechko et al. | |
| 7,647,481 B2 | 1/2010 | Rychlik | |
| 8,046,566 B2 | 10/2011 | Abernathy et al. | |
| 2009/0259815 A1* | 10/2009 | Feiste | G06F 9/3012 711/159 |
| 2009/0292892 A1* | 11/2009 | Abernathy | G06F 1/3203 711/163 |
| 2015/0134935 A1* | 5/2015 | Blasco | G06F 9/30112 712/220 |

* cited by examiner

*Primary Examiner* — John M Lindlof
(74) *Attorney, Agent, or Firm* — Meyertons, Hood, Kivlin, Kowert & Goetzel, P.C.

(57) ABSTRACT

In some embodiments, a system includes a register file, a plurality of clock gating circuits, a free list circuit, and a register allocation adjustment circuit. The register file includes a plurality of registers. The clock gating circuits control receipt of a clock signal at respective regions of registers. The free list circuit performs multiple search operations in parallel to identify unallocated registers. The register allocation adjustment circuit implements a mapping between registers identified by the free list circuit and registers of the register file such that the multiple search operations identify whether registers of a first region are unallocated prior to identifying whether registers of a second region are unallocated. As a result, a region of the register file is less likely to be in use during a particular clock cycle and a clock gating circuit may prevent a clock signal from being received at the region.

17 Claims, 10 Drawing Sheets

REGISTER ALLOCATION SYSTEM

BACKGROUND

Technical Field

This disclosure relates generally to a register allocation system.

Description of the Related Art

Many integrated circuits (IC's) utilize register files for temporary storage of data. For example, processors utilize registers of register files to store operands for performing operations and for storing results of those operations. The number of registers used may vary from one type of processor to another. Typically, registers may be at the top of a memory hierarchy and thus expected to provide responses to a processor quickly, as compared to other memory devices of a system.

In some cases, registers of a single register file may be allocated to multiple processes. For example, a first register of a register file may be allocated to a first process and a second register of the register file may be allocated to a second process, where the first process and the second process may execute concurrently. However, the first process, for example, may be unaware of use of registers of the register file by other processes (e.g., the second process). Accordingly, a free list may be used to keep track of which registers are currently unallocated. Further, because the registers may be allocated to multiple processes, during some clock cycles, some registers may not be referenced (e.g., unallocated registers). Some register allocation schemes may allocate registers in a manner that makes some power management techniques less effective.

SUMMARY

In various embodiments, a register allocation system is disclosed that includes a free list circuit, a register file, and an allocation adjustment circuit. The free list circuit may identify unallocated registers of the register file. The allocation adjustment circuit may modify allocation of registers of the register file when the registers are allocated in parallel using the free list circuit. In particular, the allocation adjustment circuit may implement mappings between registers identified by the free list circuit and the registers of the register file such that, in some cases, unallocated registers of a first region of the register file are identified prior to unallocated registers of a second region of the register file. In various embodiments, the allocation adjustment circuit may implement the mapping by adjusting an arrangement (e.g., an order) in which entries of the free list circuit are searched, by adjusting an arrangement in which the plurality of registers are addressed (e.g., an order of addresses), or both. As a result, in some cases, the system may allocate registers of the register file in a manner that increases a chance that a region of the register file is not in use during a clock cycle. Although clock gating (or some other power management technique) may be applied to individual registers, the clock gating may be more effective when applied to entire regions of the register file. Accordingly, the allocation adjustment circuit may make the clock gating more effective more frequently, as compared to a system without an allocation adjustment circuit.

In various embodiments, a register allocation system is disclosed that includes a free list circuit, a free queue circuit, and a register file. The free queue circuit may store addresses of different unallocated registers of the register file in one or more respective entries of a free queue. In particular, requests for identification of unallocated registers of the register file may be provided to the free queue circuit. Based on the free queue circuit storing at least one valid entry, the free queue circuit may provide one or more addresses corresponding to the at least one valid entry. Based on the free queue being empty, the free queue circuit may forward the request to the free list circuit, which may identify unallocated registers of the register file. Similarly, indications of deallocation of registers of the register file may be provided to the free queue circuit. Based on at least one entry of the free queue being empty, the free queue may store an address of a register being deallocated. Based on the free queue being full, the indication of deallocation may be provided to the free list circuit. In some cases, the free queue circuit receiving requests for identification of unallocated registers and indications of deallocation of registers may be faster or may consume less power as compared to a system without a free queue circuit. Additionally, in a system where registers are allocated in a manner that increases a chance that a region of the register file is not in use during a clock cycle, a system including a free queue circuit may, in some cases, maintain an increased chance that the region is not in use during the clock cycle.

Figure 1:
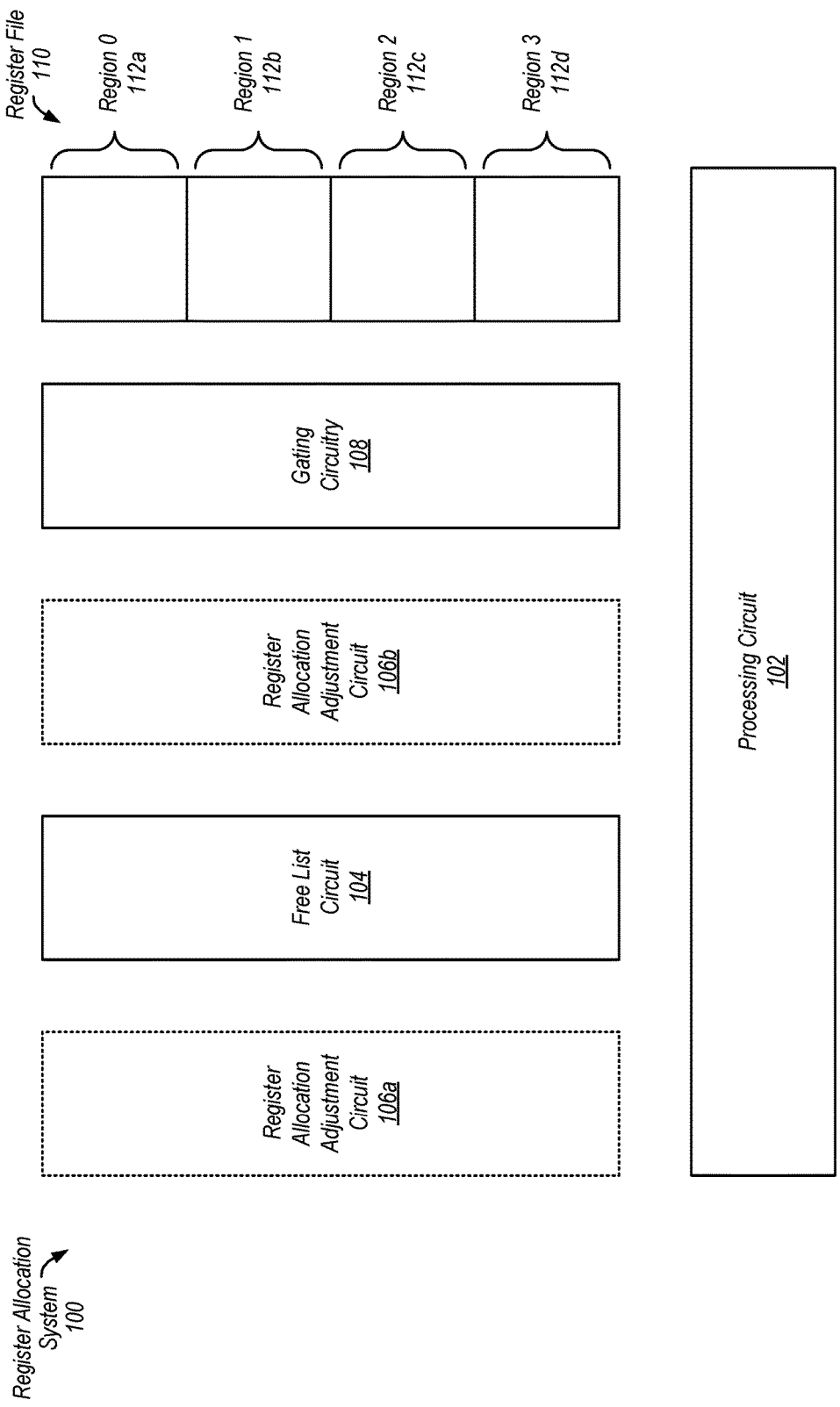
FIG. 1 is a block diagram illustrating one embodiment of an exemplary register allocation system.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "register allocation system configured to allocate registers" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION

A first register allocation system is disclosed that implements mappings between registers identified by a free list and registers of a register file based on regions of the register file such that registers of a first region of the register file are considered for allocation prior to registers of a second region of the register file. As described above, when the mappings are implemented based on the regions of the register file, in some cases, a likelihood that registers of a particular region of the register file (e.g., the second region) are not in use during a particular clock cycle may be increased. A power management technique (e.g., clock gating) may be more effective when applied to regions of the register file, as compared to individual registers. As a result, the system may consume less power, as compared to a system that does not implement the mappings between the registers identified by a free list and the registers of the register file. Embodiments of the register allocation systems described herein may implement the mappings in various ways. Two such ways described herein include implementing an arrangement of entries at the free list and implementing an arrangement of addresses at the register file, which may be performed separately or in combination.

As described herein, registers of a register file may store data on behalf of one or more processes (e.g., one or more programs or one or more portions of one or more programs). As used herein, a register is "allocated" when the register has been assigned to store data for a particular process, even if the register does not currently store data for the particular process. As used herein, a register is "unallocated" when the register has not been assigned to store data for any processes, even if the register currently stores data (e.g., data from a process that the register was previously allocated to). Registers may be deallocated, referring to a process in which the registers are changed from being "allocated" to being "unallocated."

A second register allocation system is disclosed that provides addresses of unallocated registers in response to a request for multiple unallocated registers. As described above, the second register allocation system includes a free queue that operates in conjunction with a free list. In particular, in some cases, the free queue may provide one or more addresses of unallocated registers without needing to decode an address of an unallocated register provided by the free list. Further, the free queue may store one or more addresses of unallocated registers in response to one or more deallocation indications without needing to encode an address of an unallocated register for storage at the free list. However, the free list may be used in some circumstances. For example, when the free queue is empty, the free list may be used to retrieve an address of an unallocated register in response to a request to identify at least one unallocated register. As another example, when the free queue is full, the free list may be modified to indicate that at least one register is unallocated in response to a deallocation indication corresponding to the at least one register. In some embodiments disclosed herein, some or all of the second register allocation system may be used in conjunction with the register allocation system described above. Alternatively, the first register allocation system and the second register allocation system may be used separately.

As described herein, entries of a free queue may store addresses of unallocated registers. As used herein, an entry of a free queue is "valid" when the entry is indicated (e.g., by a valid bit) as including an address that identifies an unallocated register. As used herein, an entry of a free queue is "empty" when the entry is indicated as not including an address that identifies an unallocated register and is able to receive an address that identifies an unallocated register (e.g., the entry is not in an error state). As used herein, the free queue is "full" when the free queue does not include any empty entries. As used herein, the free queue is "empty" when the free queue does not include any valid entries.

As used herein, the terms "encode" and "decode" are used to refer to the transformation of data from one format to another format. For example, as described further below, in some embodiments, addresses are "encoded" from one format to another format when they are stored at the free list and "decoded" from one format to another format when they are retrieved from the free list. However, this description does not preclude the use of circuits referred to as "decoders" (which are characterized as having a fewer number of inputs than outputs) as part of an "encoding circuit" (that performs the "encode" operation) or circuits referred to as "encoders" (which are characterized as having a greater number of inputs than outputs) as part of a "decoding circuit" (that performs the "decode" operation). For example, the encode operation may include a decoder receiving a 5-bit number and outputting a 32-bit one-hot vector. Similarly, as another example, the decode operation may include an encoder receiving a 32-bit one-hot vector and outputting a 5-bit number. In some embodiments, the encoding circuits and decoding circuits may be paired devices that enable data to be transformed between two formats. In other embodiments, the decoding circuit is configured to transform the data into a first format and the encoding circuit is configured to receive data having a second format (e.g., another device in the system is configured to transform the data from the first format into the second format). Similarly, in some embodiments, the encoding circuit is configured to transform the data into a first format and the decoding circuit is configured to receive data having a second format.

Accordingly, references herein to "encoding circuits" and "decoding circuits" each refer to structures that are configured to transform data from one format to another. "Encoding" and "decoding" circuits can alternately be thought of as "first" and "second" coding circuits, each of which performs a (different) data format transformation.

This disclosure initially describes, with reference to FIG. 1, various portions of various embodiments of a register allocation system. Example operations performed by portions of one embodiment of a register allocation system configured to implement a mapping between registers identified by a free list and registers of a register file are described with reference to FIG. 2. Example operations performed by some embodiments of a free list circuit of a register allocation system are described with reference to FIG. 3. Example operations performed by some embodiments of a clock gating circuit of a register allocation system are described with reference to FIG. 4. A method performed by an embodiment of a register allocation system that implements a mapping between registers identified by a free list and registers of a register file is described with reference to FIG. 5. Example operations performed by some embodiments of a register allocation system that includes a free queue circuit are described with reference to FIG. 6. A method performed by an embodiment of a register allocation system that includes a free queue is described with reference to FIG. 7. Example operations of two embodiments of a register allocation system are described with reference to FIGS. 8 and 9. The techniques and structures described herein, however, are in no way limited to the one or more register allocation systems described with reference to FIGS. 1-9; rather, this context is provided only as one or more possible implementations. Finally, an exemplary computing system that includes a register allocation system is described with reference to FIG. 10.

Turning now to FIG. 1, a block diagram of one embodiment of an exemplary register allocation system 100 is shown. In the illustrated embodiment, register allocation system 100 includes processing circuit 102, free list circuit 104, one or more register allocation adjustment circuits 106a-b, gating circuitry 108, and register file 110. Register file 110 includes regions 0-3 112a-d. Although register file 110 is divided into four regions in the illustrated embodiment, in other embodiments, more or fewer regions may be used.

Processing circuit 102 may execute one or more processes (e.g., one or more programs or one or more portions of one or more programs, such as one or more series of instructions) that may use registers of register file 110 to store data. The processes of processing circuit 102 may execute concurrently (e.g., in an interleaved manner or in parallel). The processes may avoid conflicts regarding attempting to store data at a same register by reserving (by requesting allocation of) various registers of register file 110 (e.g., as part of a register renaming operation). Accordingly, processing circuit 102 may request, from free list circuit 104 on behalf of one or more processes, allocation of a particular number of registers of register file 110. For example, processing circuit 102 may request, on behalf of a first series of instructions of a first program, allocation of a first quantity of registers of register file 110 and may further request, on behalf of a second series of instructions of the first program, allocation of a second quantity of registers of register file 110. Additionally, processing circuit 102 may request, on behalf of a third series of instructions of a second program, allocation of a third quantity of registers of register file 110. In some embodiments, during execution of the one or more processes, processing circuit 102 may indicate to gating circuitry 108 the registers that are in use (e.g., allocated to the processes of processing circuit 102 or actively being used by the processes of processing circuit 102) during the clock cycle. In response to no longer needing to store data at a register (e.g., because a process is terminating), processing circuit 102 may indicate to free list circuit 104 deallocation of the register via one or more deallocation indications.

Register file 110 includes a plurality of registers configured to store data for one or more processes. In the illustrated embodiment, the plurality of registers are divided into regions 0-3 112a-d such that each region includes at least two respective registers of the plurality of registers. Regions 0-3 112a-d could correspond to any logical group of registers of register file 110. However, in many cases, region 0 112a, for example, refers to a contiguous group of registers of register file 110.

Figure 3:
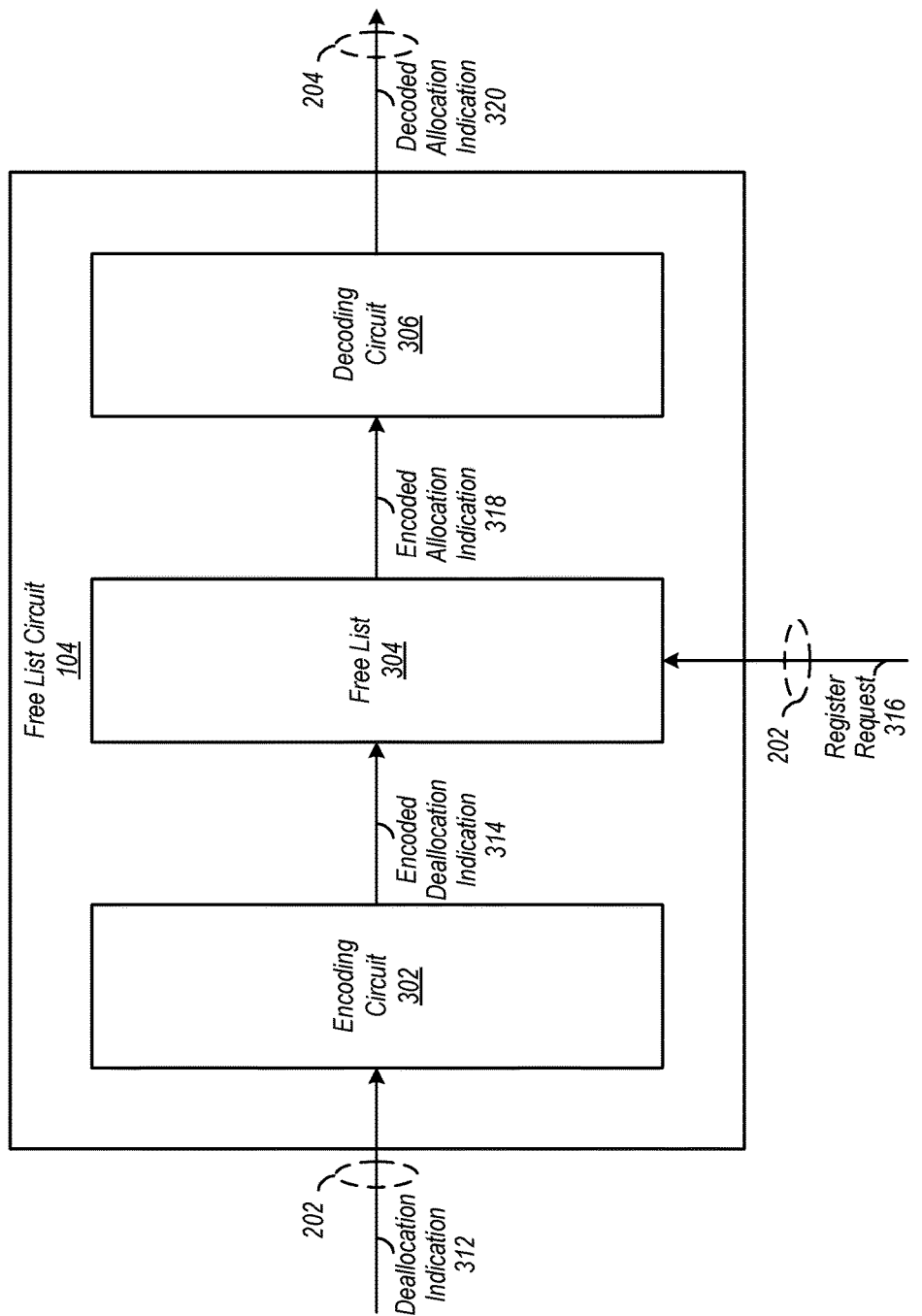
FIG. 3 is a block diagram illustrating one embodiment of an exemplary free list circuit of an exemplary register allocation system.

Free list circuit 104, as described further with reference to FIG. 3, includes a free list that indicates whether various registers of register file 110 have been allocated to various processes (e.g., processes of processing circuit 102 or to processes of one or more other processing circuits). For example, in one embodiment, free list circuit 104 stores a vector that indicates whether respective registers of register file 110 are unallocated. As another example, free list circuit 104 stores addresses of unallocated registers of register file 110. In some embodiments, the free list may also include additional information (e.g., information regarding which processes have reserved the registers). In response to one or more outstanding requests (e.g., received from processing circuit 102 or a free queue) to identify multiple unallocated registers of register file 110 (e.g., one request for multiple unallocated registers, multiple requests for one unallocated register each, or multiple requests for multiple unallocated registers each), free list circuit 104 may perform multiple search operations in parallel. The multiple search operations may be performed using different portions of the free list (e.g., the free list may be stored as multiple lists that can be searched separately or the free list may be searched in parallel using various starting points). Free list circuit 104 may indicate the multiple unallocated registers to one or more requesting processes (e.g., processes of processing circuit 102), to gating circuitry 108, or both. In response to an indication of deallocation of a register (e.g., received from processing circuit 102 or a free queue), free list circuit 104 may modify an associated portion of the free list to indicate that the corresponding register is unallocated. In some embodiments, as further discussed below with respect to FIGS. 6 and 7, free list circuit 104 may operate in conjunction with a free queue circuit. In various embodiments, various portions of register allocation system 100 may be combined or separate. For example, register allocation circuits 106a-b may be combined with free list circuit 104 or register file 110.

Figure 2:
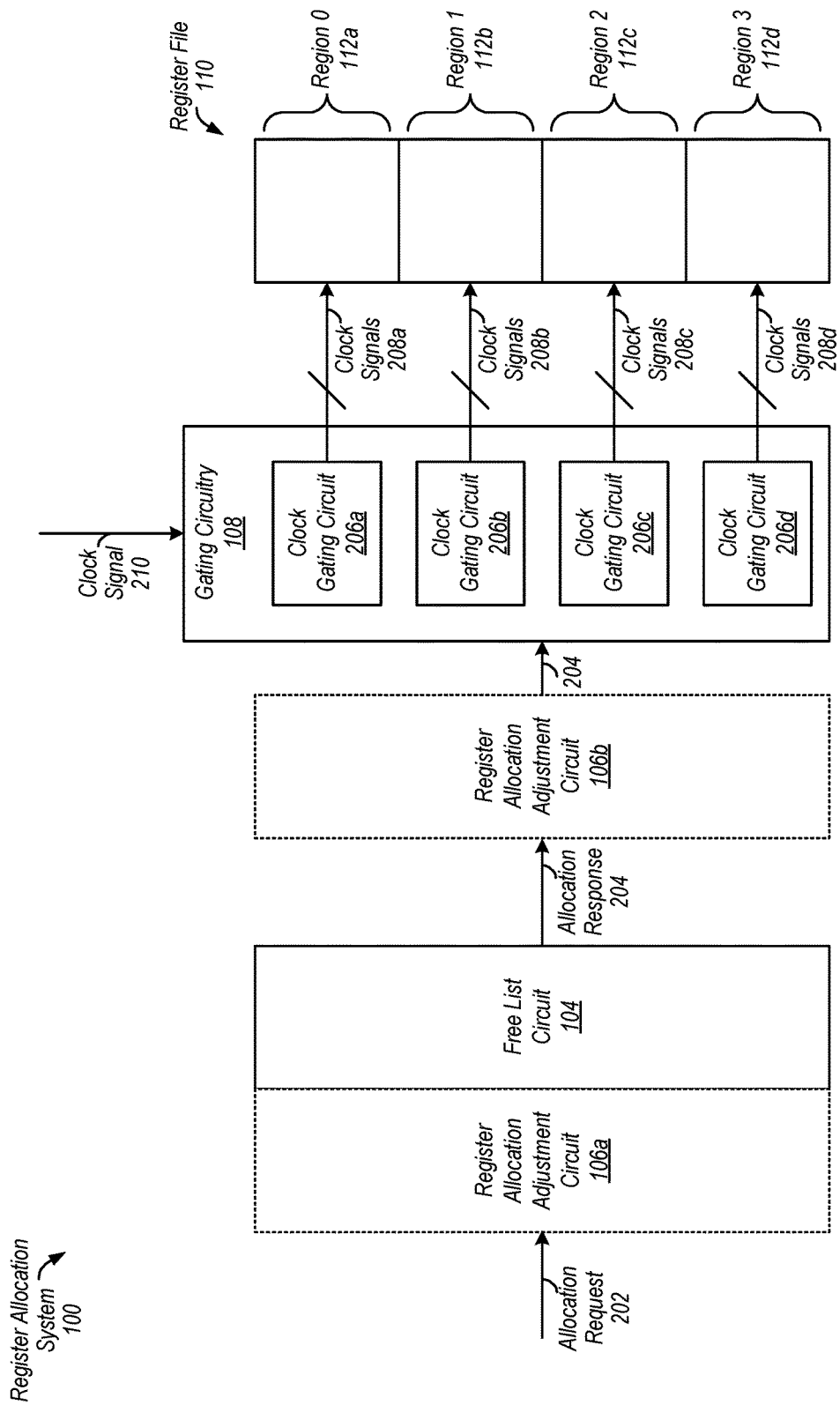
FIG. 2 is a block diagram illustrating functions performed by portions of one embodiment of an exemplary register allocation system.
Figure 4:
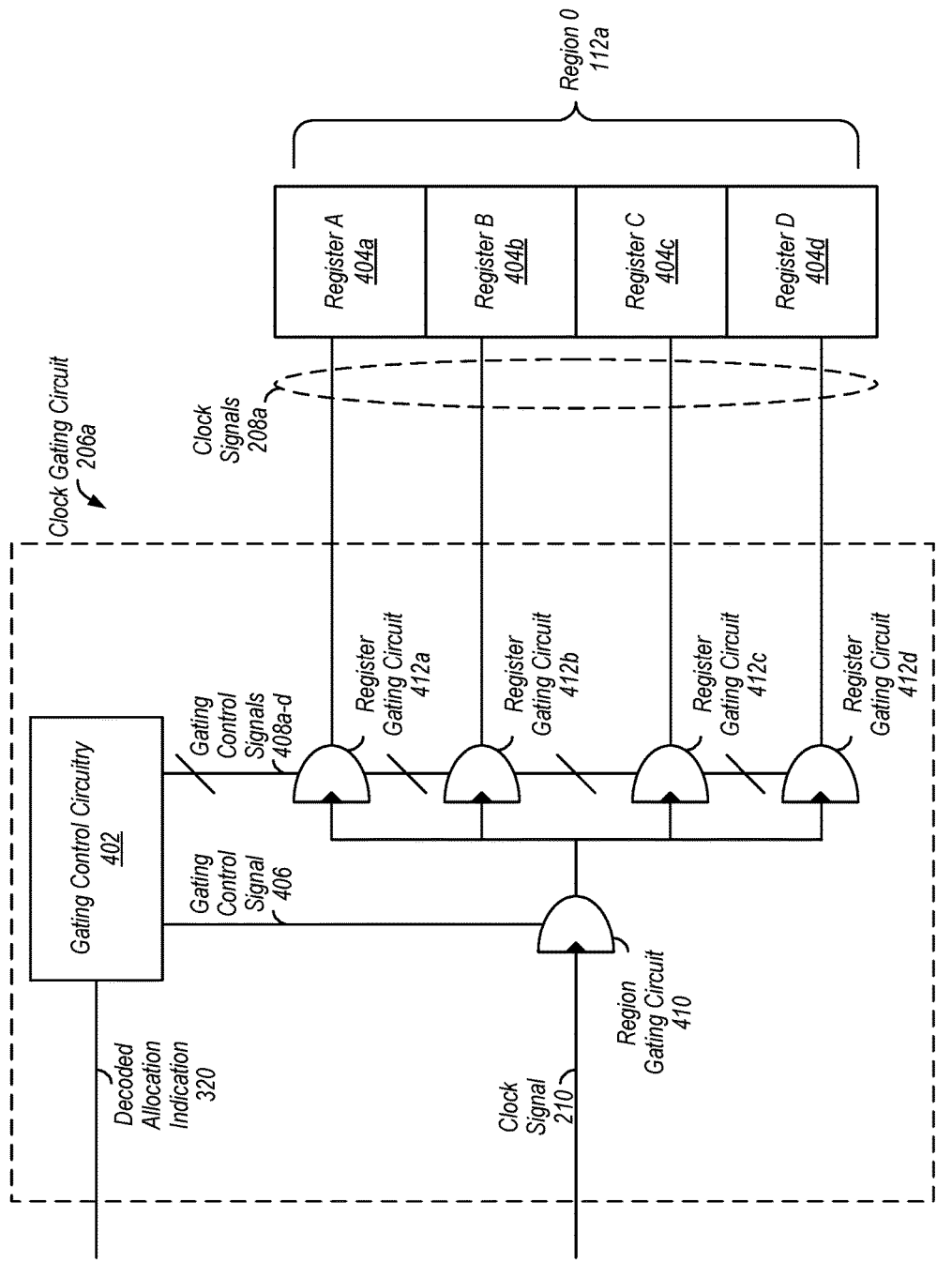
FIG. 4 is a block diagram illustrating one embodiment of an exemplary clock gating circuit of an exemplary register allocation system.

Gating circuitry 108, as described further with reference to FIGS. 2 and 4, may selectively reduce power consumption of register file 110. For example, during one or more clock cycles where various registers of register file 110 are not in use, gating circuitry 108 may control receipt of a clock signal such that the various registers do not receive the clock signal (and thus do not consume power associated with the clock signal). Gating circuitry 108 may control receipt of the clock signal for individual registers, or for regions of registers (e.g., regions 0-3 112a-d). In some embodiments, gating circuitry 108 is more effective when controlling receipt of a clock signal for an entire region (because none of the registers in the region are in use), as compared to when controlling receipt of the clock cycle for individual registers (because some of the registers in a corresponding region are in use).

As discussed above, free list circuit 104 may allocate multiple registers of register file 110 in parallel by searching multiple portions of a free list for unallocated registers. However, because multiple portions of the free list are searched, if the entries of the free list and the registers of register file 110 are both arranged sequentially, free list circuit 104 may be likely to allocate registers from different regions in response to a request for multiple unallocated registers. For example, consider a free list in which entry 0 is followed by entry 1, where entry 0 corresponds to register 0 in a register file, where entry 1 corresponds to register 1 in the register file, and so on. In this scenario, a search of different portions of the free list (e.g., entries 0-7 and entries 24-31) for two unallocated registers may result in registers from different regions of the register file being identified. As discussed above, gating circuitry 108 may be more effective when applying power management techniques to regions, as opposed to individual registers.

Register allocation adjustment circuits 106a-b may implement a mapping between one or more registers identified by free list circuit 104 and one or more respective registers of register file 110 based on regions 0-3 112a-d. In particular, as discussed further below with respect to FIG. 8, register allocation adjustment circuit 106a may implement an arrangement in which entries of free list circuit 104 are searched. For example, register allocation adjustment circuit 106a may implement an arrangement where entry 5 of free list circuit 104 corresponds to register 20 of register file 110, as opposed to an arrangement where entry 5 of free list circuit 104 corresponds to register 5 of register file 110. As discussed further below with respect to FIG. 9, register allocation adjustment circuit 106b (e.g., a decode circuit of register file 110) may implement an arrangement in which the plurality of registers are addressed. For example, register allocation adjustment circuit 106b may implement an arrangement where an address of 13 maps to register 10 of register file 110 (e.g., by adjusting an address decode of register 10). The arrangement of the entries of the free list, the registers, or both may be implemented based on expected results of an expected search pattern of the free list. For example, the expected search pattern may be a "find first" operation applied to four portions of the free list in parallel, thus the mapping may be implemented based on expected results of the find first operation. As used herein, a "find first" operation is a well-known concept, used herein according to its ordinary meaning in the art. The expected search pattern may bypass one or more entries of the free list that identify allocated registers of register file 110 until a requested number of entries have been located. In some embodiments, when multiple search operations are performed on the entries of free list circuit 104 as mapped by register allocation adjustment circuit 106a, the multiple search operations identify whether registers of a first region of register file 110 (e.g., region 0 112a) are unallocated prior to identifying whether registers of a second region of register file 110 (e.g., region 3 112d) are unallocated. As a result, register allocation system 100 may be more likely to allocate registers located in a same region, as compared to a system without at least one of register allocation adjustment circuits 106a-b.

In the illustrated embodiment, register allocation adjustment circuits 106a-b are static hardware (e.g., application-specific integrated circuits (ASICs) or an arrangement of wires) configured to implement the mapping in a static manner. However, in other embodiments, register allocation adjustment circuits 106a-b may be dynamic or reconfigurable hardware (e.g., floating point gate arrays (FPGAs)). As a result, in some cases, the mapping may be altered (e.g., based on one or more instructions or control signals).

In some embodiments, although the expected search pattern may specify a particular number of search operations performed in parallel (e.g., four), the free list may perform fewer or additional search operations in parallel. For example, although the expected search pattern may specify performing four search operations in parallel, in response to a request for two unallocated registers, the free list may perform two search operations in parallel. Additionally, the search operations may still identify whether registers of a first region are unallocated prior to identifying whether registers of a second region are unallocated.

Turning now to FIG. 2, a block diagram illustrating functions performed by portions of one embodiment of register allocation system 100 is shown. In the illustrated embodiment, gating circuitry 108 includes clock gating circuits 206a-n corresponding to regions 0-3 112a-n of register file 110.

As described above, the registers of register file 110 may be allocated to one or more processes. The processes may send allocation requests 202 (e.g., one or more register allocation requests, one or more deallocation indications, or both) to free list circuit 104. Free list circuit 104 may identify multiple unallocated registers of register file 110 in parallel in allocation response 204. Register allocation adjustment circuit 106a, register allocation adjustment circuit 106b, or both, may implement a mapping between registers identified by free list circuit 104 and registers of register file 110 such that allocation response 204 is more likely to identify registers in a same region. In the illustrated embodiment, allocation response 204 is provided to gating circuitry 108, identifying the allocated registers.

In the illustrated example, gating circuitry 108 receives clock signal 210 and forwards, via clock gating circuits 206a-d, clock signal 210 to regions 0-3 112a-d as clock signals 208a-d. However, as described further below with reference to FIG. 4, in response to determining (e.g., based on one or more allocation responses) that one or more regions of register file 110 are not in use, respective clock gating circuits may prevent clock signal 210 from being forwarded to the one or more regions (e.g., by not providing a respective clock signal of clock signals 208a-d). Similarly, clock gating circuits 206a-d may prevent clock signal 210 from being forwarded to individual registers of regions 0-3 112a-d. Accordingly, register allocation system 100 may adjust a mapping between free list circuit 104 and register file 110 that, in some cases, increases a chance that gating circuitry 108 may prevent clock signal 210 from being sent to one or more regions of register file 110.

In the illustrated embodiment, allocation response 204 is provided to gating circuitry 108, identifying the allocated registers. However, in other embodiments, allocation response 204 is not provided to gating circuitry 108. Instead, gating circuitry 108 may receive one or more indications of registers, regions, or both of register file that are in use from one or more other circuits (e.g., processing circuit 102 of FIG. 1).

Turning now to FIG. 3, a block diagram illustrating functions of one embodiment of free list circuit 104 of FIG. 1 is shown. In the illustrated embodiment, free list circuit 104 includes encoding circuit 302, free list 304, and decoding circuit 306. Additionally, allocation request 202 of FIG. 2 is illustrated as deallocation indication 312 and register request 316. Allocation response 204 is illustrated as decoded allocation indication 320. In other embodiments, free list circuit may not include at least one or encoding circuit 302 or decoding circuit 306 (e.g., free list 304 may store addresses of registers such that encoding circuit 302, decoding circuit 306, or both are not used).

As described above, free list circuit 104 may store indications of whether registers of a register file (e.g., register file 110 of FIG. 1) are unallocated. The indications may be stored at one or more memory devices as free list 304. In the illustrated embodiment, free list 304 is a bit vector that indicates whether corresponding registers are allocated or unallocated. For example, a bit having a value of "1" in entry 23 of free list 304 may indicate that register 23 (as mapped using one or more allocation adjustment circuits) is allocated.

In response to one or more register requests 316 that, together, request identification of multiple unallocated registers, free list circuit 104 may search free list 304 in parallel and identify corresponding unallocated registers. In the illustrated embodiment, the corresponding portions of free list 304 may be modified to indicate that the identified registers are now allocated and one or more indications of the identified registers may be sent to decoding circuit 306 as encoded allocation indication 318. Decoding circuit 306 may decode encoded allocation indication 318 into one or more addresses of the identified registers and output the one or more addresses as decoded allocation indication 320.

In response to one or more deallocation indications 312 that identify one or more addresses of registers being deallocated, encoding circuit 302 may identify respective entries of free list 304 based on the one or more addresses (e.g., by encoding the one or more addresses). The respective entries may be sent to free list 304 as encoded deallocation indication 314. In response to encoded deallocation indication 314, corresponding portions of free list 304 may be modified to indicate that the registers identified by deallocation indication 312 are now unallocated. Accordingly, free list circuit 104 may track whether registers of a register file are unallocated.

Turning now to FIG. 4, a block diagram illustrating functions of one embodiment of clock gating circuit 206a of FIG. 2 is shown. In the illustrated embodiment, clock gating circuit 206a includes gating control circuitry 402, region gating circuit 410, and register gating circuits 412a-d. Region 0 112a includes registers A-D 404a-d.

As described above, clock gating circuit 206a may control whether clock signal 210 is received at registers A-D 404a-d of region 0 112a. More specifically, based on decoded allocation indication 320, clock gating circuit 206a may prevent clock signal 210 from being provided to one or more of registers A-D 404a-d. Clock gating circuit 206a may control whether clock signal 210 is provided to region 0 112a using gating control signal 406 and region gating circuit 410. Clock gating circuit 206a may control whether clock signal 210 is provided to individual registers (e.g., to register A 404a but not to register B 404b) using gating control signals 408a-d and register gating circuits 412a-d. When a register does not receive clock signal 210, less power is consumed, as compared to when the register receives clock signal 210 when not in use.

As a first example, in response to decoded allocation indication 320 indicating that none of registers A-D 404a-d are in use, gating control circuitry 402 may indicate, via gating control signal 406, that region gating circuit 410 should not provide clock signal 210 to registers A-D 404a-d (e.g., via register gating circuits 412a-d). In some embodiments, when gating control signal 406 indicates that region 0 112a should not receive clock signal 210, gating control signals 408a-d are not sent.

As a second example, in response to decoded allocation indication 320 indicating that register A 404*a* is in use but register B 404*b* is not in use, gating control circuitry 402 may send gating control signal 406 to region gating circuit 410 and may send gating control signals 408*a-d* to register gating circuits 412*a-d*. Gating control signal 406 may indicate that clock signal 210 should be sent to register gating circuits 412*a-d*. Gating control signal 408*a* may indicate that register gating circuit 412*a* should send clock signal 210 (received via region gating circuit 410) to register A 404*a*. Gating control signal 408*b* may indicate that register gating circuit 412*b* should not send clock signal 210 to register B 404*b*.

As described above, in some embodiments, preventing clock signal 210 from being sent to region 0 112*a* using region gating circuit 410, may consume less power, as compared to using all of register gating circuits 412*a-d*. Accordingly, clock gating circuit 206*a* may selectively control power consumption of region 0 112*a*.

Figure 5:
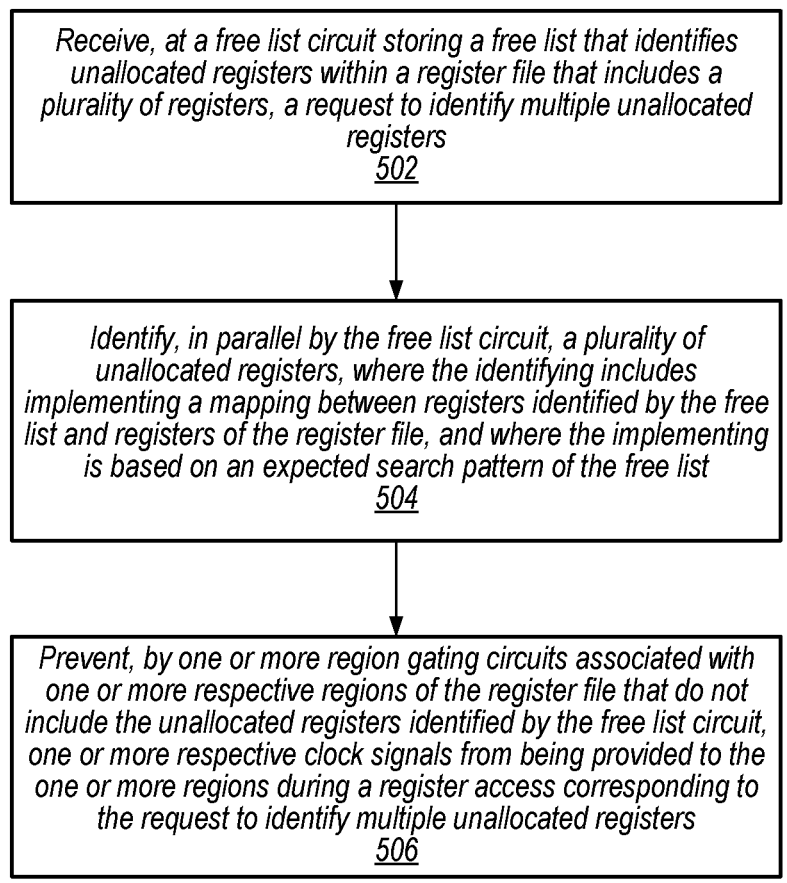
FIG. 5 is a flow diagram illustrating one embodiment of a method of allocating registers for and managing power consumption of a register file.

Referring now to FIG. 5, a flow diagram of a method 500 is depicted. Method 500 is an embodiment of a method of allocating registers for and managing power consumption of a register file. In some embodiments, method 500 may be initiated or performed by one or more processors in response to one or more instructions stored by a computer-readable storage medium.

At 502, method 500 includes receiving, at a free list circuit storing a free list that identifies unallocated registers within a register file that includes a plurality of registers, a request to identify multiple unallocated registers. For example, method 500 may include free list circuit 104 receiving a request to identify multiple unallocated registers.

At 504, method 500 includes identifying, in parallel by the free list circuit, a plurality of unallocated registers. The identifying may include implementing a mapping between registers identified by the free list and registers of the register file. Additionally, the implementing may be based on an expected search pattern of the free list. For example, method 500 may include free list circuit 104 identifying a plurality of unallocated registers of register file 110. The identifying may include a register allocation adjustment circuit, such as register allocation adjustment circuit 106*a*, register allocation adjustment circuit 106*b*, or both implement a mapping between free list 304 and register file 110, as described further with respect to FIGS. 8 and 9.

At 506, method 500 includes preventing, by one or more region gating circuits associated with one or more respective regions of the register file that do not include the unallocated registers identified by the free list circuit, one or more respective clock signals from being provided to the one or more regions during a register access corresponding to the request to identify multiple unallocated registers. For example, the method 500 may include region gating circuit 410 preventing clock signals 208*a* from being provided to region 0 112*a* during a register access corresponding to (e.g., from a same process as or from a process that generates) the request to identify multiple unallocated registers. Accordingly, a method of allocating registers for and managing power consumption of a register file is depicted.

Figure 6:
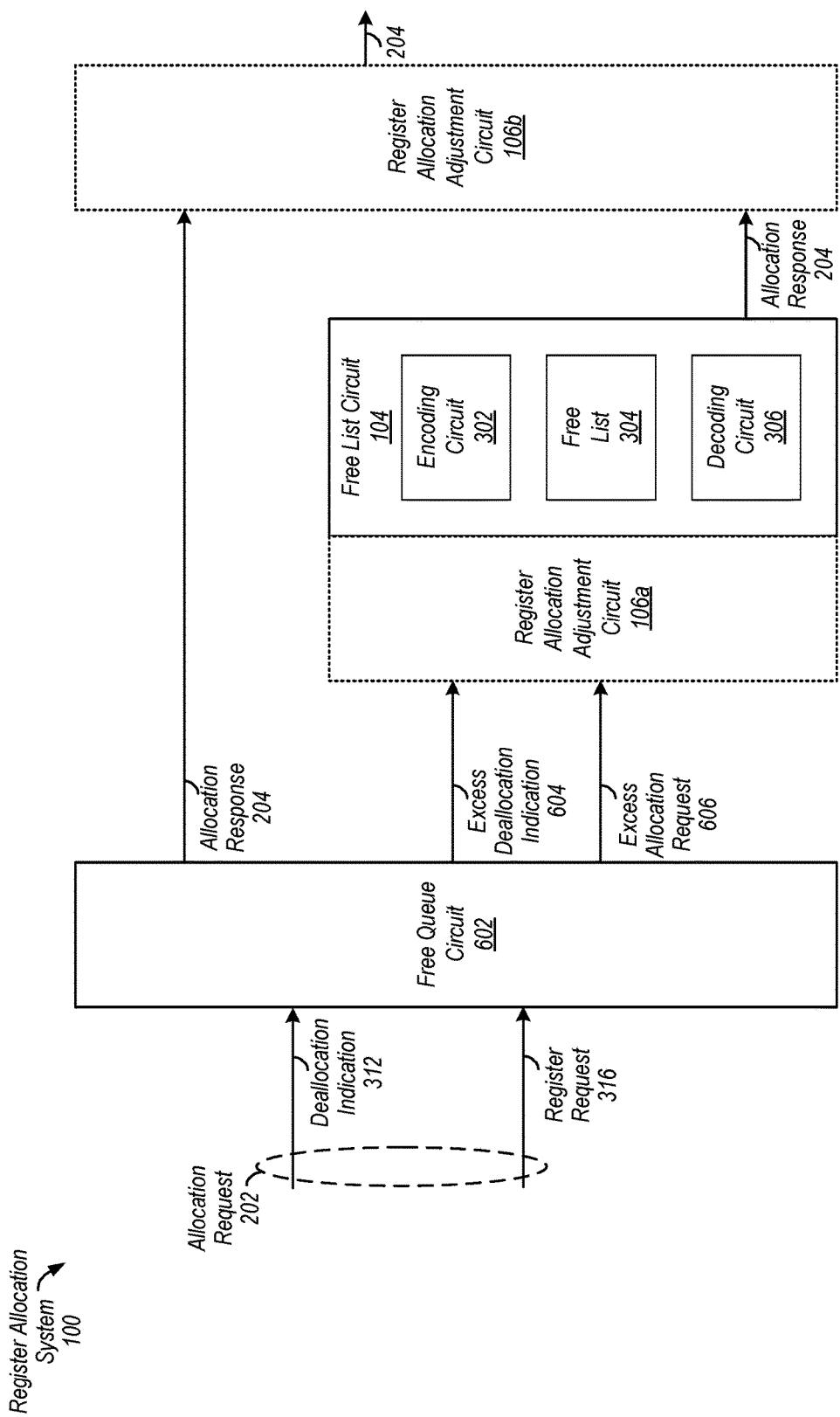
FIG. 6 is a block diagram illustrating one embodiment of an exemplary register allocation system that includes a free queue circuit.

Turning now to FIG. 6, a block diagram illustrating example operations performed by one embodiment of register allocation system 100 that includes free queue circuit 602 is shown. For clarity, only some portions of register allocation system 100 are shown. In other embodiments, free queue circuit 602 and free list circuit 104 may be included in another system (e.g., a system that does not include gating circuitry 108 of FIG. 1).

As described above with reference to FIG. 3, free list circuit 104 may provide, in response to register request 316, via free list 304 and decoding circuit 306, allocation response 204 that indicates one or more unallocated registers. Additionally, free list circuit 104 may modify, in response to deallocation indication 312, via encoding circuit 302, free list 304 to indicate that one or more registers indicated by deallocation indication 312 are unallocated.

Free queue circuit 602 may include one or more memory devices that implement a free queue (e.g., a first-in-first-out queue) that stores one or more addresses of different unallocated registers of a register file (e.g., register file 110 of FIG. 1). Free queue circuit 602 may provide the one or more addresses in response to one or more requests for unallocated registers. In the illustrated embodiment, allocation request 202 (e.g., deallocation indication 312 or register request 316) is sent to free queue circuit 602, rather than to free list circuit 104. In some cases, allocation request 202 may be fulfilled without register allocation system 100 referring to free list circuit 104 (e.g., thus bypassing an encoding operation at encoding circuit 302, a decoding operation at decoding circuit 306, or both). Accordingly, in some cases, the free queue may indicate some registers as being deallocated even though free list 304 indicates the registers as being allocated (because the associated deallocation indications were never sent to free list circuit 104). In other cases, allocation request 202 may be forwarded to free list circuit 104. Additionally, in some embodiments, free queue circuit 602 may correspond to a plurality of free list circuits, a plurality of register files, or both (e.g., by storing multiple queues for entries of different free list circuits).

As a first example, in response to deallocation indication 312 and based on the free queue including at least one empty entry, free queue circuit 602 may store an address indicated by deallocation indication 312 in the at least one empty entry. In response to deallocation indication 312 and based on to the free queue being full, free queue circuit 602 may provide the address to free list circuit 104 as excess deallocation indication 604. In some embodiments, if deallocation indication 312 indicates multiple addresses and the free queue does not include at least a number of empty entries equal to the multiple addresses, free queue circuit 602 may store addresses equal to the number of empty entries and send additional addresses to free list circuit 104 as excess deallocation indication 604. In other embodiments, if deallocation indication 312 indicates multiple addresses and the free queue does not include at least a number of empty entries equal to the multiple addresses, free queue circuit 602 may send all of the multiple addresses to free list circuit 104 as excess deallocation indication 604.

As a second example, in response to register request 316 and based on the free queue including at least one valid entry, free queue circuit 602 may provide one or more addresses of different unallocated registers (corresponding to the at least one valid entry) as allocation response 204. In response to register request 316 and based on the free queue being empty, free queue circuit 602 may provide register request 316 to free list circuit 104 as excess allocation request 606. In some embodiments, if free queue circuit 602 stores fewer than a requested number of valid entries, free queue circuit 602 may output register addresses corresponding to all valid entries of the free queue and request additional register addresses from free list circuit 104. In other embodiments, if free queue circuit 602 stores fewer than a requested number of valid entries, free queue circuit 602 may forward register request 316 to free list circuit 104.

Accordingly, allocation response 204 may be output from free queue circuit 602, free list circuit 104, or both.

As discussed above, one or more register allocation adjustment circuits 106a-b may be used to adjust a mapping between free list circuit 104 and a register file. In particular, register allocation adjustment circuit 106a may adjust an arrangement in which entries of the free list 304 are searched in response to excess deallocation indication 604, excess allocation request 606, or both. Accordingly, in some embodiments, excess deallocation indication 604, excess allocation request 606, or both may be sent to free list circuit 104 via register allocation adjustment circuit 106a. Register allocation adjustment circuit 106b may adjust an arrangement in which the registers of a register file (e.g., register file 110) are addressed in response to allocation response 204, which, as discussed above, may be provided by free queue circuit 602, free list circuit 104, or both. Accordingly, in some embodiments, allocation response 204 may be sent from free queue circuit 602, free list circuit 104, or both to register allocation adjustment circuit 106b.

Accordingly, in some cases, free queue circuit 602 may save power, time, or both associated with sending a request to free list circuit 104 (e.g., with encoding, decoding, or both the request and with searching the free list). Further, in cases where registers in a same region are allocated and deallocated together, in the illustrated embodiment, the registers may be grouped together in the free queue circuit 602, thus increasing a chance that the registers will be allocated together in response to a future register request. Accordingly, when registers are allocated in a manner that increases a chance that a region of a register file is not in use during a clock cycle, free queue circuit 602 may, in some cases, maintain an increased chance that the region is not in use during the clock cycle.

Figure 7:
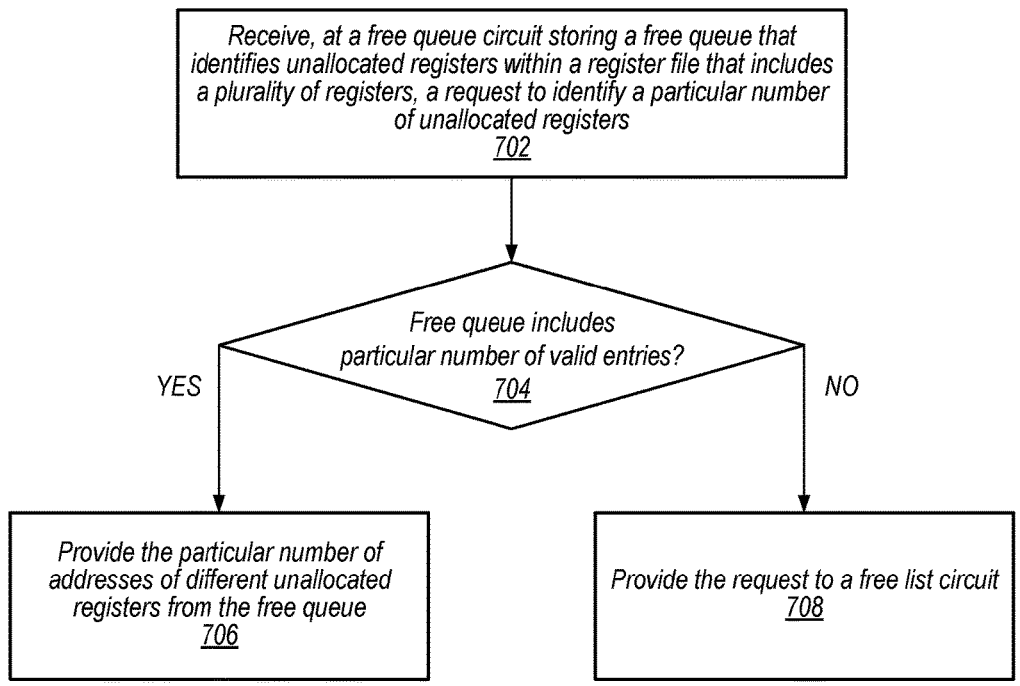
FIG. 7 is a flow diagram illustrating one embodiment of a method of allocating registers for a register file using a free queue circuit.

Referring now to FIG. 7, a flow diagram of a method 700 is depicted. Method 700 is an embodiment of a method of allocating registers for a register file using a free queue circuit. In some embodiments, method 700 may be initiated or performed by one or more processors in response to one or more instructions stored by a computer-readable storage medium.

At 702, method 700 includes receiving, a free queue circuit storing a free queue that identifies unallocated registers within a register file that includes a plurality of registers, a request to identify a particular number unallocated registers. For example, method 700 may include free queue circuit 602 receiving a request to identify multiple unallocated registers.

At 704, method 700 varies based on whether the free queue includes at least the particular number of valid entries. For example, the free queue of free queue circuit 602 may include exactly the particular number of valid entries or may include more than the particular number of valid entries. Alternatively, the free queue may be empty or may include fewer than the particular number of valid entries.

At 706, method 700 includes providing the particular number of addresses of different unallocated registers from the free queue. For example, in response to the free queue including exactly the particular number of valid entries or more than the particular number of valid entries, free queue circuit 602 may provide the particular number of addresses of different unallocated registers from the free queue as allocation response 204.

At 708, method 700 includes providing the request to a free list circuit. For example, in response to the free queue including fewer than the particular number of valid entries, free queue circuit 602 may provide at least a portion of the request to a free list circuit. Accordingly, a method of allocating registers for a register file using a free queue circuit is depicted.

Figure 8:
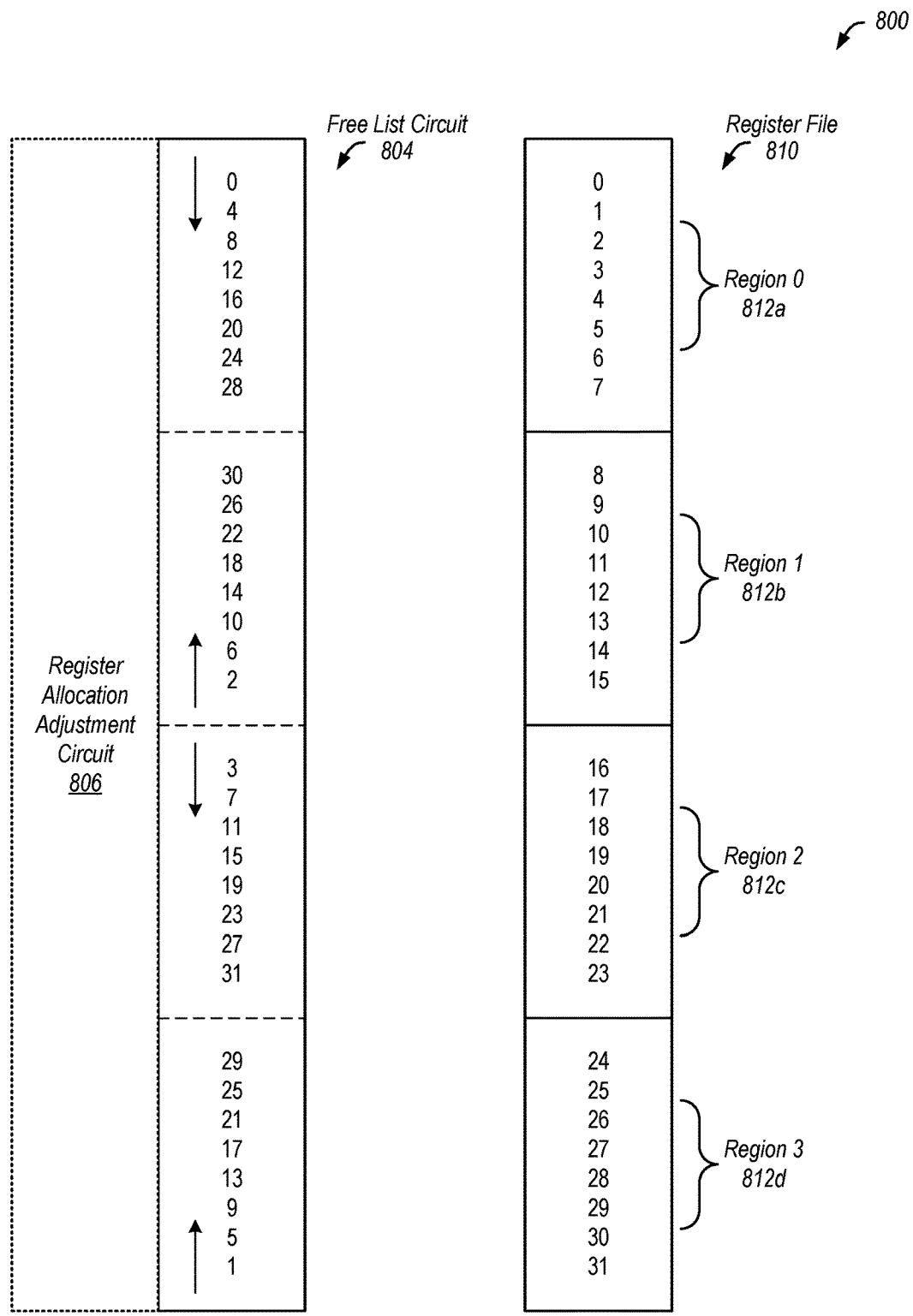
FIG. 8 is a block diagram illustrating a first example mapping operation performed by one embodiment of an exemplary register allocation system.
Figure 9:
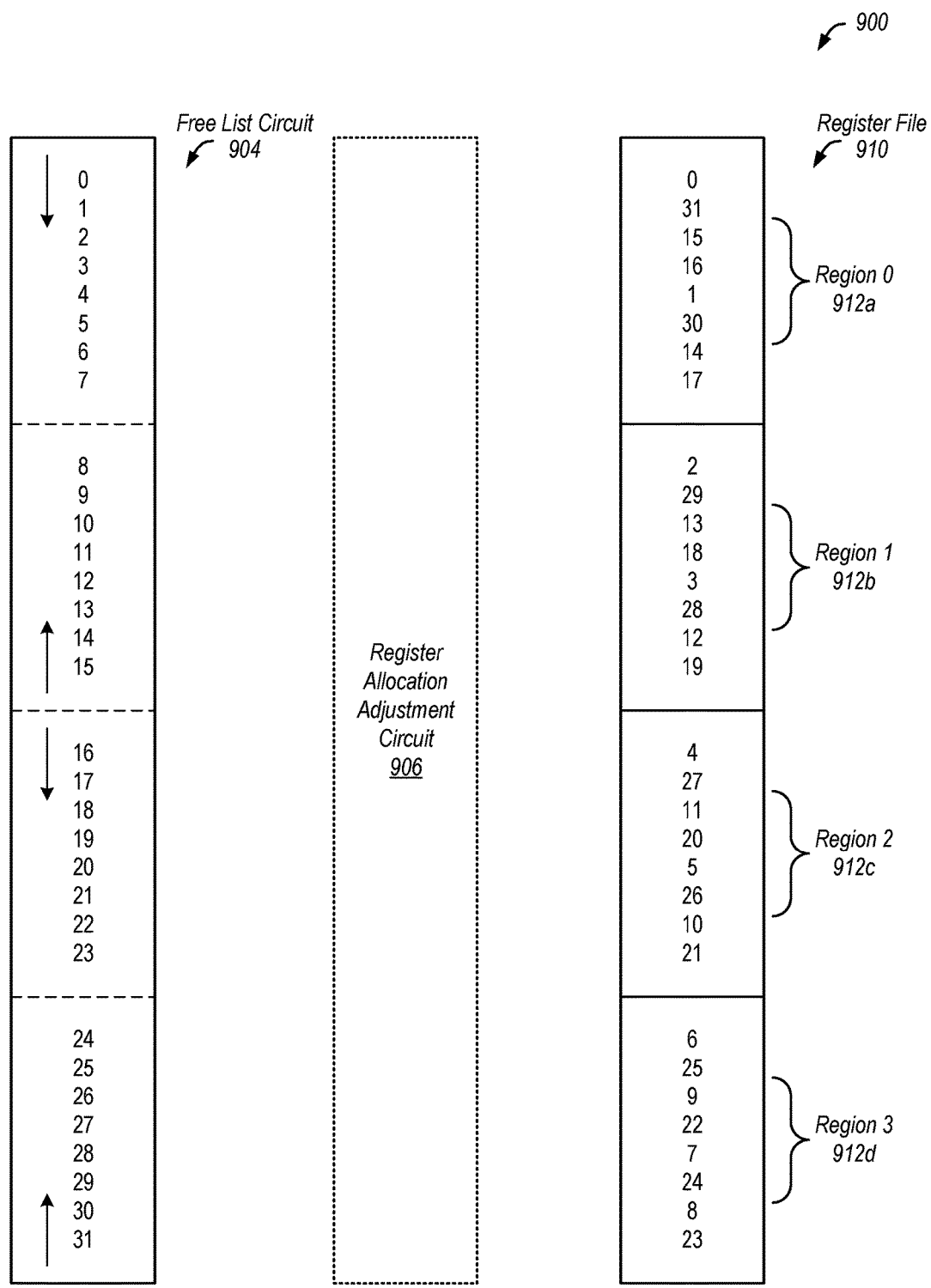
FIG. 9 is a block diagram illustrating a second example mapping operation performed by one embodiment of an exemplary register allocation system.

FIGS. 8 and 9, described next, relate to implementation of a mapping between entries identified by a free list and registers of a register file. By way of comparison, first consider a mapping in which entry 0 of the free list corresponds to register 0 of the register file, entry 1 of the free list corresponds to register 1, etc. Using such a mapping, however, the expected search operations depicted by FIGS. 8 and 9 would result in entries being considered for identification by the free list in a manner that, in many cases, would result in registers of multiple regions being identified. But under the exemplary mappings described in reference to FIGS. 8 and 9, a likelihood of at least one of the regions of the register file being unused may be increased.

Turning next to FIG. 8, a block diagram of a first example mapping operation performed by one embodiment of an exemplary register allocation system 800 is shown. In the illustrated embodiment, register allocation system 800 includes free list circuit 804, register allocation adjustment circuit 806, and register file 810. Register file 810 includes regions 0-3 812a-d. In some embodiments, register allocation system 800, free list circuit 804, register allocation adjustment circuit 806, register file 810, and regions 0-3 812a-d correspond to register allocation system 100, free list circuit 104, register allocation adjustment circuit 106a, register file 110, and regions 0-3 112a-d, respectively, of FIGS. 1 and 2.

In particular, FIG. 8 illustrates an example implementation of an arrangement in which entries of free list circuit 104 are searched such that a chance that a region of register file 810 is not in use during a clock cycle is increased. In the illustrated embodiment, free list circuit 804 includes 32 entries (corresponding to the 32 registers of register file 810) and may perform up to four search operations in parallel. Rather than the entries of free list circuit 804 being ordered sequentially, register allocation adjustment circuit 806 may implement a mapping between free list circuit 804 and register file 810 based on an expected search operation. For example, the entries of free list circuit 804 may be expected to be searched four times in parallel as denoted by the arrows. In the illustrated embodiment, because of the mapping, when four search operations are performed in parallel, the search operations may determine whether registers 0, 1, 2, and 3 are unallocated prior to determining whether, for example, registers 16, 17, 18, and 19 are unallocated (if needed). As a result, registers 0-7 of region 0 812a are more likely to be allocated in response to a request than registers 24-31 of region 3 812d. Further, as the registers of register file 810 become allocated, it is more likely that registers of various regions continue to be allocated together. For example, after registers 0-7 have been allocated, it is likely that registers 8-15 will be allocated together. As a result, a likelihood of a region being unused (and thus being gated by an associated region gating circuit rather than one or more associated register gating circuits) is increased.

Although four different portions of free list circuit 804 are illustrated, in some embodiments, if the search operation does not identify an unallocated register in a particular portion of free list circuit 804, the search operation may consider other portions of free list circuit 804. For example, if registers 3, 7, 11, 15, 19, 23, 27, and 31 are all allocated, the search operation may consider whether register 29 is allocated.

Although the example illustrates four search operations being performed in parallel, search operations for fewer or more unallocated registers may similarly benefit from an order in which the entries of free list circuit 804 are searched. In particular, a search for two unallocated registers may determine whether registers 0, 4, 1, and 5 of region 0 812*a* are unallocated prior to determining whether registers 16, 17, 20, and 21 of region 2 812*c* are unallocated. Similarly, a free list circuit that can perform eight search operations in parallel may still determine whether registers of some regions are unallocated prior to determining whether registers of other regions are unallocated. For example, eight search operations performed in parallel may consider whether registers 0, 4, 2, 6, 3, 7, 1, and 5 of region 0 812*a* are unallocated in parallel with considering whether registers 28, 24, 30, 26, 31, 27, 29, and 25 of region 3 812*d* are unallocated. However, such search operations may still consider whether registers of regions 0 and 3 (indicated by reference numerals 812*a* and 812*d*, respectively) are unallocated prior to considering whether registers of regions 1 and 2 (indicated by reference numerals 812*b* and 812*c*, respectively) are unallocated. Thus, even though the entries of free list circuit 804 are arranged based on performing four search operations in parallel, a likelihood of a region being unused is increased even when other numbers of search operations are performed in parallel.

Turning next to FIG. 9, a block diagram of a second example mapping operation performed by one embodiment of an exemplary register allocation system 900 is shown. In the illustrated embodiment, register allocation system 900 includes free list circuit 904, register allocation adjustment circuit 906, and register file 910. Register file 910 includes regions 0-3 912*a-d*. In some embodiments, register allocation system 900, free list circuit 904, register allocation adjustment circuit 906, register file 910, and regions 0-3 912*a-d* correspond to register allocation system 100, free list circuit 104, register allocation adjustment circuit 106*b*, register file 110, and regions 0-3 112*a-d*, respectively, of FIGS. 1 and 2.

In particular, FIG. 9 illustrates an example implementation of an arrangement in which registers of register file 110 are addressed such that a chance that a region of register file 910 is not in use during a clock cycle is increased. In some embodiments, the implementation may be performed by a decode circuit that causes adjacent registers in the register file to have the non-sequential addresses, as illustrated. In the illustrated embodiment, register file 910 includes 32 registers (corresponding to the 32 entries of free list circuit 904). Free list circuit 904 may perform up to four search operations in parallel. Rather than the registers of register file 910 being ordered sequentially, register allocation adjustment circuit 906 may implement a mapping between free list circuit 904 and register file 910 based on an expected search operation. For example, the entries of free list circuit 904 may be expected to be searched four times in parallel as denoted by the arrows. In the illustrated embodiment, because of the mapping, when four search operations are performed in parallel, the search operations may determine whether registers 0, 31, 15, and 16 of region 0 912*a* are unallocated prior to determining whether, for example, registers 4, 27, 11, and 20 of region 2 912*c* are unallocated (if needed). As a result, registers of region 0 912*a* are more likely to be allocated in response to a request than registers of region 2 912*c*. Further, as the registers of register file 910 become allocated, it is more likely that registers of various regions continue to be allocated together. For example, after the registers of region 0 912*a* have been allocated, it is likely that the registers of region 1 912*b* will be allocated together. As a result, a likelihood of a region being unused (and thus being gated by an associated region gating circuit rather than one or more associated register gating circuits) is increased.

Although four different portions of free list circuit 904 are illustrated, in some embodiments, if the search operation does not identify an unallocated register in a particular portion of free list circuit 904, the search operation may consider other portions of free list circuit 904. For example, if registers 16-23 are all allocated, the search operation may consider whether register 24 is allocated.

Although the example illustrates four search operations being performed in parallel, search operations for fewer or more unallocated registers may similarly benefit from the implementation of the arrangement in which the registers of register file 910 are searched. In particular, a search for two unallocated registers may determine whether registers 0, 1, 31, and 30 of region 0 912*a* are unallocated prior to determining whether registers 4, 5, 27, and 26 of region 2 912*c* are unallocated. Similarly, a free list circuit that can perform eight search operations in parallel may still determine whether registers of some regions are unallocated prior to determining whether registers of other regions are unallocated. For example, eight search operations performed in parallel may consider whether the registers of region 0 912*a* are unallocated in parallel with considering whether the registers of region 3 912*d* are unallocated. However, such search operations may still consider whether registers of regions 0 and 3 (indicated by reference numerals 912*a* and 912*d*, respectively) are unallocated prior to considering whether registers of regions 1 and 2 (indicated by reference numerals 912*b* and 912*c*, respectively) are unallocated. Thus, even though the entries of free list circuit 904 are arranged based on performing four search operations in parallel, a likelihood of a region being unused is increased even when other numbers of search operations are performed in parallel.

Figure 10:
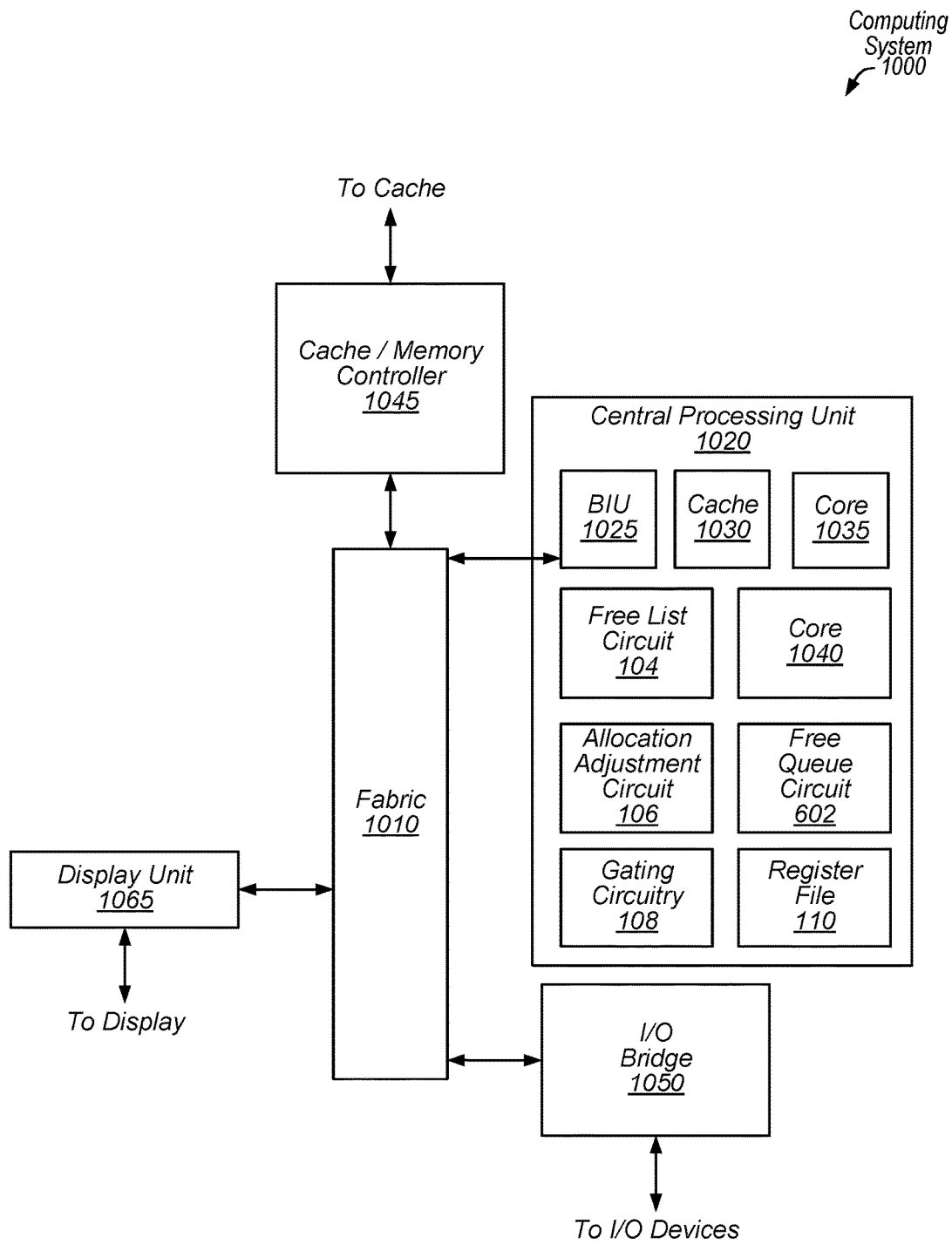
FIG. 10 is block diagram illustrating an embodiment of an exemplary computing system that includes at least a portion of an exemplary register allocation system.

Turning next to FIG. 10, a block diagram illustrating an exemplary embodiment of a computing system 1000 that includes at least a portion of an exemplary register allocation system. Computing system 1000 includes various circuits described above with reference to FIGS. 1-9. Computing system 1000 may further include any variations or modifications described previously with reference to FIGS. 1-9. In some embodiments, some or all elements of the computing system 1000 may be included within a system on a chip (SoC). In some embodiments, computing system 1000 is included in a mobile device. Accordingly, in at least some embodiments, area, timing, and power consumption of computing system 1000 may be important design considerations. In the illustrated embodiment, computing system 1000 includes fabric 1010, central processing unit (CPU) 1020, input/output (I/O) bridge 1050, cache/memory controller 1045, and display unit 1065. Although the computing system 1000 illustrates central processing unit 1020 as being connected to fabric 1010 as a sole central processing unit of the computing system 1000, in other embodiments, central processing unit 1020 may be connected to or included in other components of the computing system 1000 and other central processing units may be present. Additionally or alternatively, the computing system 1000 may include multiple central processing units 1020. The multiple central processing units 1020 may correspond to different embodiments or to the same embodiment.

Fabric 1010 may include various interconnects, buses, MUXes, controllers, etc., and may be configured to facilitate communication between various elements of computing system 1000. In some embodiments, portions of fabric 1010 are configured to implement various different communication protocols. In other embodiments, fabric 1010 implements a single communication protocol and elements coupled to fabric 1010 may convert from the single communication protocol to other communication protocols internally.

In the illustrated embodiment, central processing unit 1020 includes bus interface unit (BIU) 1025, cache 1030, cores 1035 and 1040, free list circuit 104, allocation adjustment circuit 106 (e.g., register allocation adjustment circuit 106*a*, register allocation adjustment circuit 106*b*, or both), gating circuitry 108, and register file 110 of FIG. 1, and free queue circuit 602 of FIG. 6. In various embodiments, central processing unit 1020 includes various numbers of cores and/or caches. For example, central processing unit 1020 may include 1, 2, or 4 processor cores, or any other suitable number. In some embodiments, cores 1035 and/or 1040 include internal instruction and/or data caches. In some embodiments, a coherency unit (not shown) in fabric 1010, cache 1030, or elsewhere in computing system 1000 is configured to maintain coherency between various caches of computing system 1000. BIU 1025 may be configured to manage communication between central processing unit 1020 and other elements of computing system 1000. Processor cores 1035 and 1040 may be configured to execute instructions of a particular instruction set architecture (ISA), which may include operating system instructions and user application instructions.

Cache/memory controller 1045 may be configured to manage transfer of data between fabric 1010 and one or more caches and/or memories (e.g., non-transitory computer readable mediums). For example, cache/memory controller 1045 may be coupled to an L3 cache, which may, in turn, be coupled to a system memory. In other embodiments, cache/memory controller 1045 is directly coupled to a memory. In some embodiments, the cache/memory controller 1045 includes one or more internal caches. In some embodiments, the cache/memory controller 1045 may include or be coupled to one or more caches and/or memories that include instructions that, when executed by one or more processors, cause the processor, processors, or cores to initiate or perform some or all of the operations described above with reference to FIGS. 1-9.

As used herein, the term "coupled to" may indicate one or more connections between elements, and a coupling may include intervening elements. For example, in FIG. 10, display unit 1065 may be described as "coupled to" central processing unit 1020 through fabric 1010. In contrast, in the illustrated embodiment of FIG. 10, display unit 1065 is "directly coupled" to fabric 1010 because there are no intervening elements.

Display unit 1065 may be configured to read data from a frame buffer and provide a stream of pixel values for display. Display unit 1065 may be configured as a display pipeline in some embodiments. Additionally, display unit 1065 may be configured to blend multiple frames to produce an output frame. Further, display unit 1065 may include one or more interfaces (e.g., MIPI® or embedded display port (eDP)) for coupling to a user display (e.g., a touchscreen or an external display).

I/O bridge 1050 may include various elements configured to implement: universal serial bus (USB) communications, security, audio, and/or low-power always-on functionality, for example. I/O bridge 1050 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 1000 via I/O bridge 1050. In some embodiments, central processing unit 1020 may be coupled to computing system 1000 via I/O bridge 1050.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
a register file comprising a plurality of registers;
a plurality of clock gating circuits corresponding to respective regions of the register file, wherein a first clock gating circuit is configured to control receipt of a clock signal at a first region of the register file based on whether registers of the first region are in use, wherein a second clock gating circuit is configured to control receipt of the clock signal at a second region of the register file based on whether registers of the second region are in use, and wherein the first and second regions includes at least two of the plurality of registers;
a free list circuit configured to store a free list that identifies unallocated registers of the register file, wherein the free list circuit is configured to perform multiple search operations in parallel with each other on different portions of the free list in response to one or more outstanding requests to identify multiple unallocated registers; and
a register allocation adjustment circuit configured to implement a mapping between registers identified by the free list circuit and registers of the register file based on the respective regions, wherein the mapping is organized in a manner that causes the free list circuit to identify unallocated registers of the first region prior to identifying unallocated registers of the second region.

2. The system of claim 1, wherein the register allocation adjustment circuit is configured to implement the mapping between the registers identified by the free list circuit and the registers of the register file by adjusting an arrangement in which entries of the free list circuit are searched.

3. The system of claim 1, wherein the register allocation adjustment circuit is configured to implement the mapping between the registers identified by free list circuit and the registers of the register file by adjusting an arrangement in which the plurality of registers is addressed.

4. The system of claim 1, wherein the register allocation adjustment circuit is configured to implement the mapping based on expected results of a find first operation that includes performing a particular number of searches of the free list in parallel.

5. The system of claim 4, wherein the free list circuit is configured to search for at most a second particular number of unallocated registers in parallel in response to the one or more outstanding requests asking for identification of at least the second particular number of unallocated registers, wherein the second particular number is larger than the particular number.

6. The system of claim 1, wherein the first clock gating circuit comprises:
   a plurality of register gating circuits configured to control receipt of the clock signal at respective registers in the first region; and
   a region gating circuit configured to control receipt of the clock signal at the plurality of register gating circuits.

7. The system of claim 6, wherein, to prevent receipt of the clock signal at all of the registers of the first region during a particular clock cycle, the region gating circuit preventing receipt of the clock signal at the plurality of register gating circuits is configured to consume less power than the plurality of register gating circuits preventing receipt of the clock signal at all of the registers of the region.

8. The system of claim 1, wherein the free list circuit comprises multiple memory devices, wherein a first memory device of the memory devices is configured to store a first portion of the free list, and wherein a second memory device of the memory devices is configured to store a second portion of the free list, and wherein, to perform the multiple search operations in parallel, the free list circuit is configured to search the first portion of the free list at the first memory device and the second portion of the free list at the second memory device in parallel.

9. The system of claim 1, wherein the one or more outstanding requests each request identification of a single respective unallocated register of the register file.

10. The system of claim 1, further comprising:
    a free queue circuit configured to:
      store one or more addresses of different unallocated registers of the register file in one or more respective entries of a free queue;
      responsive to a request to identify at least one unallocated register of the register file:
        based on the free queue storing at least one valid entry, provide one or more addresses of different unallocated registers; and
        based on the free queue circuit being empty, provide the request to the free list circuit.

11. A method, comprising:
    storing, at a free list circuit, a free list that identifies unallocated registers within a register file having a plurality of regions, wherein the plurality of regions includes a first region of registers controlled by a first region gating circuit and a second region of registers controlled by a second region gating circuit;
    receiving, at the free list circuit, a request to identify multiple unallocated registers;
    identifying, in parallel by the free list circuit, a plurality of unallocated registers, wherein the identifying includes using a mapping between registers identified by the free list and registers of the register file, and wherein the mapping is implemented in manner that causes the free list circuit to identify unallocated registers in the first region for allocation before identifying unallocated registers in the second region for allocation based on an expected search pattern of the free list; and
    preventing, by one or more region gating circuits, one or more respective clock signals from being provided to one or more of the plurality of regions during a register access corresponding to the request to identify multiple unallocated registers, wherein the one or more regions do not include allocated registers.

12. The method of claim 11, wherein identifying the plurality of unallocated registers comprises searching multiple portions of the free list in parallel.

13. The method of claim 12, wherein searching a particular portion of the multiple portions comprises bypassing one or more entries of the free list that identify allocated registers of the register file.

14. The method of claim 11, wherein the request to identify the multiple unallocated registers is received from a particular process, and wherein the register access is requested by the particular process.

15. An integrated circuit, comprising:
    a register file having a first region of registers and a second region of registers;
    a plurality of clock gating circuits including a first gating circuit and a second gating circuit, wherein a first gating circuit is configured to control a clock signal provided to the first region, wherein a second gating circuit is configured to control a clock signal provided to the second region;
    a free list circuit configured to:
      store a free list that identifies unallocated registers of the register file; and
      in response to one or more outstanding requests to identify multiple unallocated registers, perform multiple search operations on different portions of the free list in parallel; and
    a register allocation adjustment circuit configured to implement a mapping between registers identified by the free list circuit and registers of the register file, wherein the mapping is implemented in a manner that causes the free list circuit, during performance of the multiple searches, to identify unallocated registers of the first region prior to identifying unallocated registers of the second region.

16. The integrated circuit of claim 15, wherein the register allocation adjustment circuit is configured to implement the mapping between the registers identified by the free list circuit and the registers of the register file by adjusting an arrangement in which entries of the free list circuit are searched.

17. The integrated circuit of claim 15, wherein the register allocation adjustment circuit is configured to implement the mapping between the registers identified by free list circuit and the registers of the register file by adjusting an arrangement in which registers of the register file are addressed.

* * * * *